United States Patent
Dravneek et al.

(10) Patent No.: US 11,107,112 B1
(45) Date of Patent: Aug. 31, 2021

(54) SYSTEM FOR CORRELATION BASED ON RESOURCE USAGE

(71) Applicant: Bank of America Corporation, Charlotte, NC (US)

(72) Inventors: Victoria L. Dravneek, Charlotte, NC (US); Jill Marie Moser, Louisville, KY (US); Matthew Murphy, Charlotte, NC (US); Matthew Robert Gray Pitner, Alpharetta, GA (US); Karen Lea MacQueen, Lyndhurst, OH (US); Brandy Lachole Brown, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/002,090

(22) Filed: Aug. 25, 2020

(51) Int. Cl.
  *G06Q 30/02* (2012.01)
  *G06Q 30/06* (2012.01)
  *G06F 17/15* (2006.01)

(52) U.S. Cl.
  CPC ......... *G06Q 30/0233* (2013.01); *G06F 17/15* (2013.01); *G06Q 30/0215* (2013.01); *G06Q 30/0641* (2013.01)

(58) Field of Classification Search
  CPC .................................................... G06Q 30/02
  See application file for complete search history.

(56) References Cited

U.S. PATENT DOCUMENTS

| | | |
|---|---|---|
| 7,472,081 B1 | 12/2008 | Cason |
| 8,355,946 B2 | 1/2013 | Hammond et al. |
| 8,355,948 B2 | 1/2013 | Mason |
| 8,775,253 B2 | 7/2014 | Comerford et al. |
| 8,833,645 B2 | 9/2014 | Stretch et al. |
| 9,514,483 B2 | 12/2016 | Chomsky et al. |
| 9,646,319 B2 | 5/2017 | Hammond et al. |
| 9,841,282 B2 | 12/2017 | VonDerheide et al. |
| 10,007,923 B1 | 6/2018 | Strock et al. |
| 10,332,143 B2 | 6/2019 | Comerford et al. |
| 10,528,975 B2 | 1/2020 | Quatse et al. |
| 10,733,631 B2 * | 8/2020 | Flowers ................... G06N 5/04 |
| 11,004,092 B2 * | 5/2021 | MacIlwaine ....... G06Q 30/0273 |

(Continued)

FOREIGN PATENT DOCUMENTS

EP    2247988 A1 *  11/2010  ............ G06W 10/00

OTHER PUBLICATIONS

Yunfu Huo; Lin Ma;Xiangbin Zhang; Ping Liang, Inverse Optimization for Resources of Informationservices in IMC (English), 2009 Fourth International Conference on Innovative Computing, Information an Control (ICICIC) (pp. 717-720), Dec. 1, 2009 (Year: 2009).*

*Primary Examiner* — Marilyn G Macasiano

(74) *Attorney, Agent, or Firm* — Michael A. Springs; Moore & Van Allen PLLC; Nicholas C. Russell

(57) ABSTRACT

Embodiments of the invention are directed to a system, method, and computer program product for resource correlation based on resource usage. The system first determines a quantity of graphical prompts capable of being displayed within the area of a display. The system determines, based on the quantity of graphical prompts, a quantity of resource allocation offers. The system generates a quantity of graphical prompts based on the quantity of resource allocation offers.

20 Claims, 5 Drawing Sheets

(56) References Cited

U.S. PATENT DOCUMENTS

| | | | |
|---|---|---|---|
| 2010/0161379 A1* | 6/2010 | Bene | G06Q 30/02 |
| | | | 705/7.31 |
| 2012/0166261 A1* | 6/2012 | Velusamy | G06Q 30/0214 |
| | | | 705/14.16 |
| 2013/0035975 A1* | 2/2013 | Cavander | G06Q 30/02 |
| | | | 705/7.22 |
| 2013/0173377 A1* | 7/2013 | Keller | G06Q 30/0261 |
| | | | 705/14.35 |
| 2017/0161769 A1 | 6/2017 | Johnson et al. | |
| 2019/0147484 A1 | 5/2019 | Monaco et al. | |
| 2019/0147708 A1 | 5/2019 | Monaco et al. | |
| 2019/0213626 A1* | 7/2019 | Khoyilar | G06F 16/144 |

* cited by examiner

SYSTEM FOR CORRELATION BASED ON RESOURCE USAGE

FIELD OF THE INVENTION

The present invention is directed to, in general, a novel, proactive approach for resource presentment and allocation based on historical data usage. Specifically, embodiments of the present invention are directed to providing a resource allocation offer to a user based on historical resource distribution data stored within a memory resource.

BACKGROUND

A resource entity may want to provide a user with a reward or gift to complete a resource transaction. The resource entity may provide the user with a resource allocation offer that indicates the reward or gift. However, users may receive a large number of resource allocation offers, even though the user may not be interested in a majority of the offers as the offers are not pertinent to the user. Accordingly, there is a need for systems and methods to improve how resource allocation offers are provided to users.

The previous discussion of the background to the invention is provided for illustrative purposes only and is not an acknowledgement or admission that any of the material referred to is or was part of the common general knowledge at the priority date of the application.

SUMMARY

In one aspect, the present disclosure is directed to a system for resource presentment and allocation based on historical data usage. In one embodiment, the system can comprise at least one memory device; at least one communication device connected to a communications network; at least one processing device operatively coupled to the at least one memory device; and a module stored in the at least one memory device comprising executable instructions. The executable instructions, that when executed by the at least one processing device, can cause the at least one processing device to receive, by a resource network from an external resource entity, a resource allocation offer associated with a resource distribution transaction; determine, based on historical resource distribution data stored within a memory resource, a user of a plurality of users that would utilize the resource allocation offer; transmit, to a user device associated with the user via a resource application, a first communication that indicates the resource allocation offer; receive, from the user device associated with the user, a second communication that indicates acceptance of the resource allocation offer; store, in the memory resource, data that indicates that the user accepted the resource allocation offer; and transmit, to the external resource entity, a third communication that indicates acceptance of the resource allocation offer.

In another embodiment, and in combination with any of the previous embodiments, the resource network is associated with resource entity, and the external resource entity is not associated with the resource network.

In another embodiment, and in combination with any of the previous embodiments, the executable instructions further cause the at least one processing device to: receive an indication that the user completed a resource transaction associated with the resource allocation offer; store, in the memory resource, data that indicates that the user completed a resource transaction associated with the resource allocation offer; and transmit, to the external resource entity, a fifth communication that indicates that the user completed the resource transaction associated with the resource allocation offer.

In another embodiment, and in combination with any of the previous embodiments, the executable instructions further cause the at least one processing device to: update the historical resource distribution data to indicate that the user completed the resource transaction; determine, based on the updated historical resource distribution data, another resource allocation offer; and transmit, to the user device via the resource application, a fourth communication that indicates the another resource allocation offer. The another resource allocation offer comprises one or more features that are similar to the resource allocation offer.

In another embodiment, and in combination with any of the previous embodiments, the executable instructions further cause the at least one processing device to: determine a resource account associated with the user; determine, based on the resource allocation offer and based on the indication that the user completed the resource transaction, a quantity of resources to credit to the resource account associated with the user; and add the quantity of resources to the resource account associated with the user.

In another embodiment, and in combination with any of the previous embodiments, the executable instructions further cause the at least one processing device to: receive, by the resource network from another external resource entity, another resource allocation offer; determine, based on the another resource allocation offer, that the resource allocation offer and the another resource allocation offer are associated with the same resource distribution transaction; and determine, based on the resource allocation offer, that the user would not utilize the another resource allocation offer.

In another embodiment, and in combination with any of the previous embodiments, the executable instructions further cause the at least one processing device to: determine, based on preference data associated with the plurality of users, that the user would prefer the resource allocation offer; modify, based on the acceptance of the resource allocation offer, preference data associated with the user to indicate that the user accepted the resource allocation offer; and store, within the memory resource, the modified preference data associated with the user.

In another aspect, the present disclosure is directed to a system for resource correlation based on resource usage, the system comprising: at least one memory device; at least one communication device connected to a communications network; at least one processing device operatively coupled to the at least one memory device; and a module stored in the at least one memory device comprising executable instructions. The executable instructions, that when executed by the at least one processing device, cause the at least one processing device to: determine, based on an area of a display of a user device, a quantity of graphical prompts capable of being displayed within the area of the display; determine, based on the quantity of graphical prompts capable of being displayed within the area of the display, a quantity of resource allocation offers capable of being displayed within the area of the display. Each of the plurality of resource allocation offers are associated with a respective resource distribution transaction. The executable instructions can also cause the at least one processing device to: determine, based on historical resource distribution data associated with a user associated with the user device, a plurality of resource allocation offers that correspond to the quantity of resource allocation offers; generate, based on the plurality of resource allocation offers that correspond to the quantity of resource allocation offers, a respective graphical prompt for each of the plurality of resource allocation offers, and display, within the area of the display of the user device, the respective graphical prompt for each of the plurality of resource allocation offers.

In another embodiment, and in combination with any of the previous embodiments, the executable instructions further cause the at least one processing device to: receive an indication that the user actuated at least one of the graphical prompts to indicate the user accepted the resource allocation offer; store, in a memory resource, data that indicates that the user accepted the resource allocation offer; and transmit, to an external resource entity, a communication that indicates that the user accepted the resource allocation offer.

In another embodiment, and in combination with any of the previous embodiments, the executable instructions further cause the at least one processing device to: receive an indication that the user completed a resource transaction associated with the resource allocation offer; store, in the memory resource, data that indicates that the user completed a resource transaction associated with the resource allocation offer; and transmit, to the external resource entity, another communication that indicates that the user completed the resource transaction associated with the resource allocation offer.

In another embodiment, and in combination with any of the previous embodiments, the executable instructions further cause the at least one processing device to: determine a resource account associated with the user; determine, based on the resource allocation offer and based on the indication that the user completed the resource transaction, a quantity of resources to credit to the resource account associated with the user; and add the quantity of resources to the resource account associated with the user.

In another embodiment, and in combination with any of the previous embodiments, the executable instructions further cause the at least one processing device to: generate a graphical notification that indicates that the quantity of resources was added to the resource account associated with the user; and display the graphical notification that indicates that the quantity of resources was added to the resource account associated with the user.

In another embodiment, and in combination with any of the previous embodiments, the executable instructions further cause the at least one processing device to: determine, based on preference data associated with the user, that the user would prefer the resource allocation offer; modify, based on the acceptance of the resource allocation offer, preference data associated with the user to indicate that the user accepted the resource allocation offer; and store, within the memory resource, the modified preference data associated with the user.

In another embodiment, and in combination with any of the previous embodiments, the executable instructions further cause the at least one processing device to: transmit, to the user device via a resource application associated with a resource network, the respective graphical prompt for each of the plurality of resource allocation offers; and display, via the resource application, the respective graphical prompt for each of the plurality of resource allocation offers.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
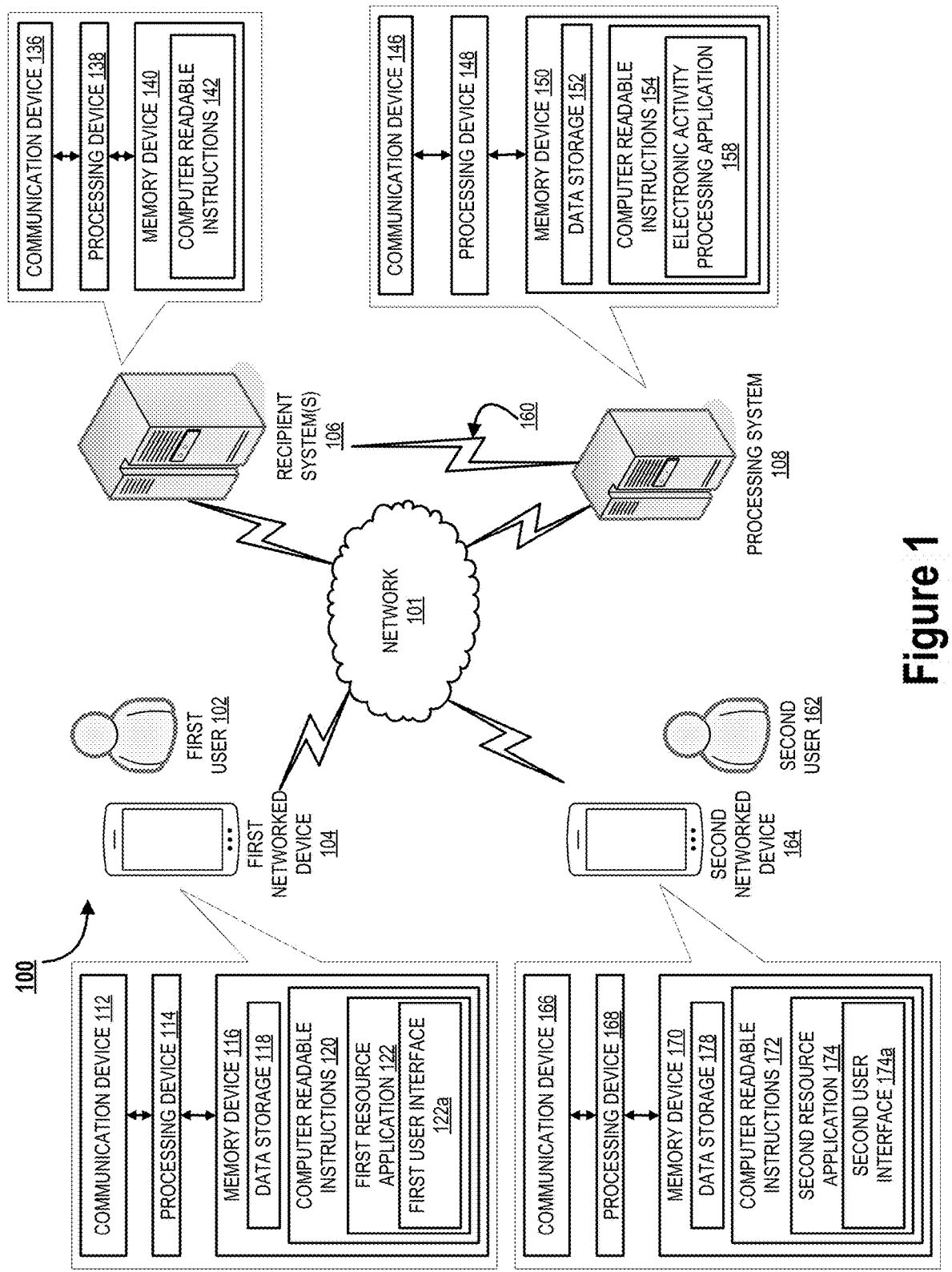
Figure 2:
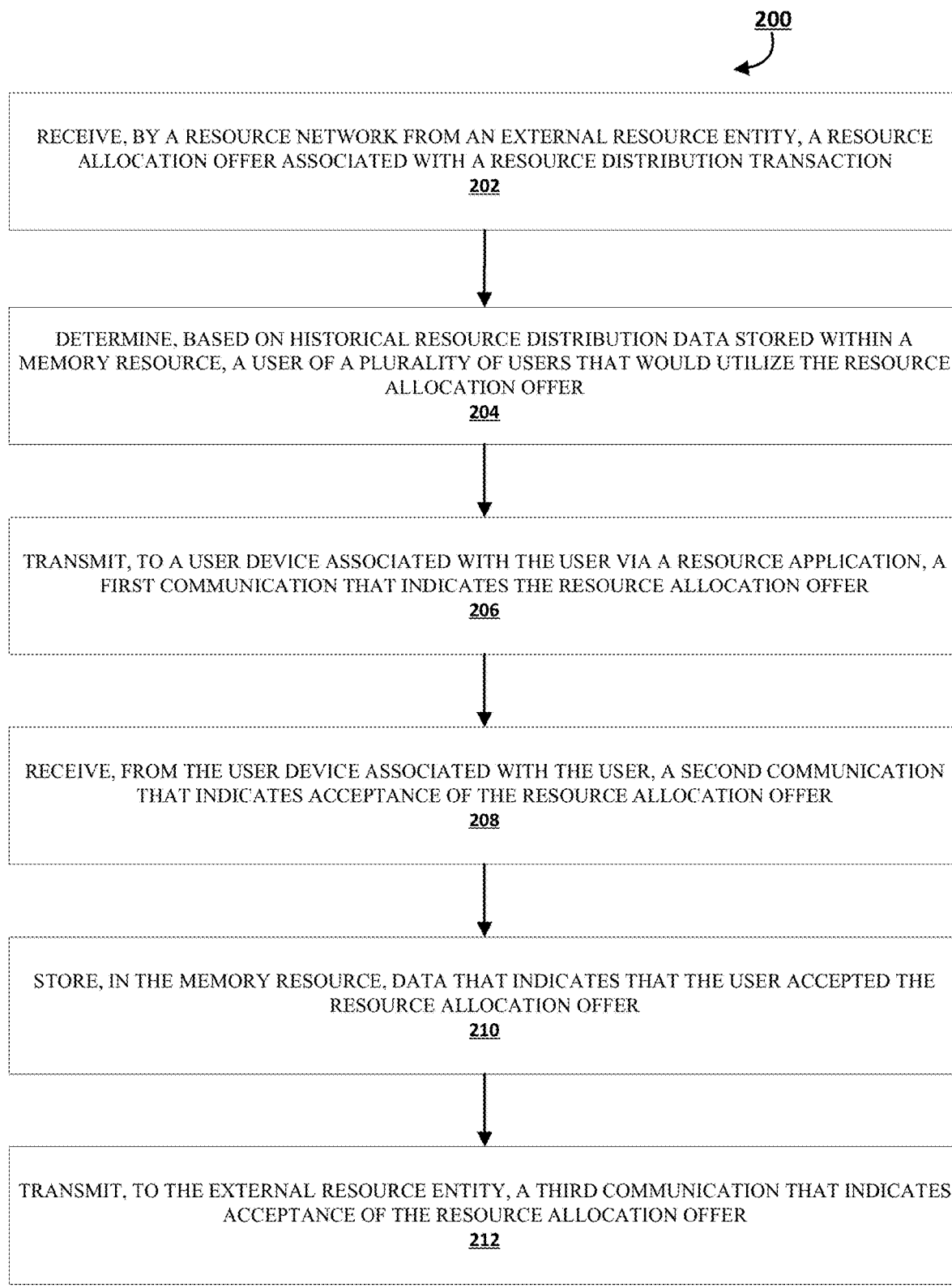
Figure 3:
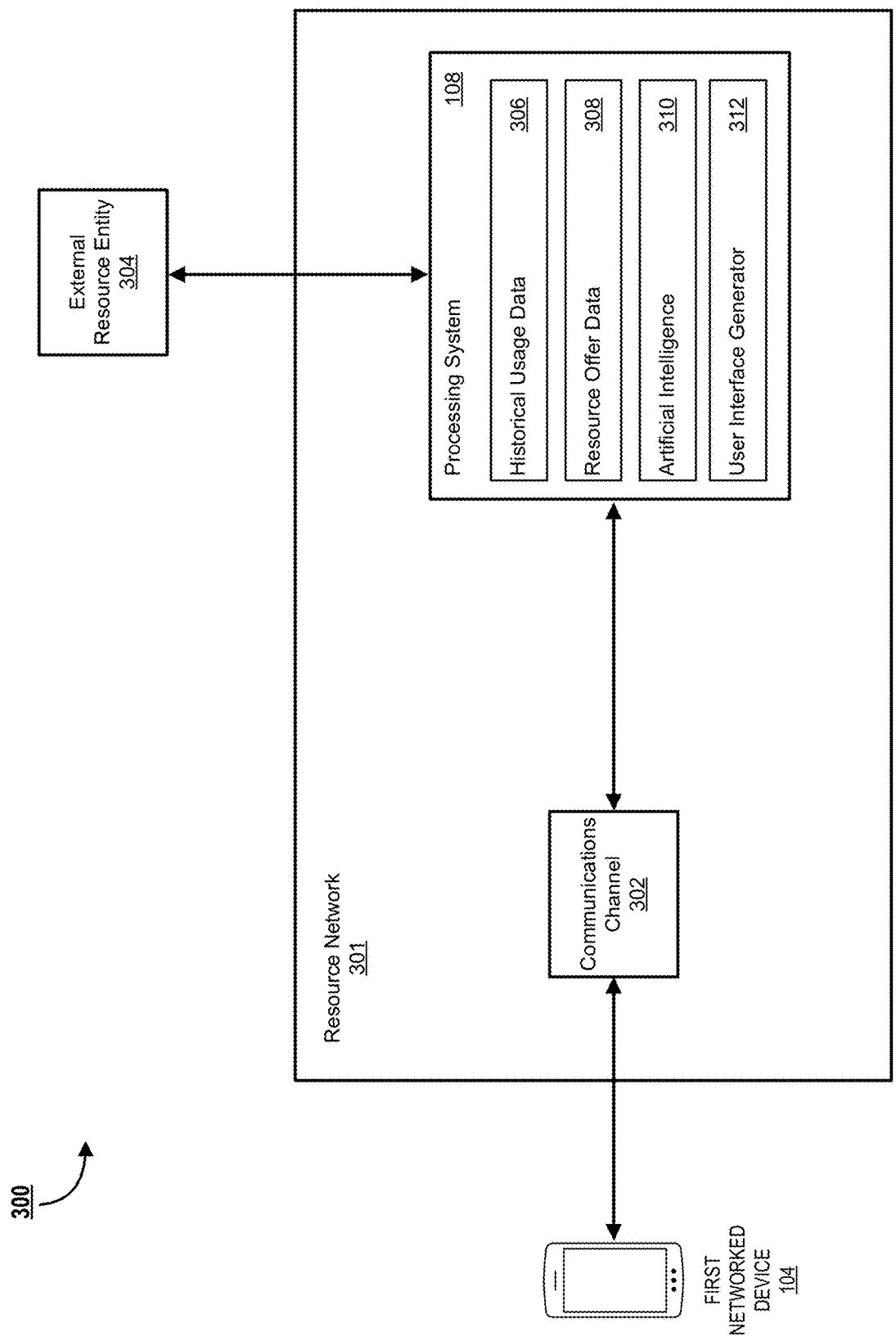
Figure 4:
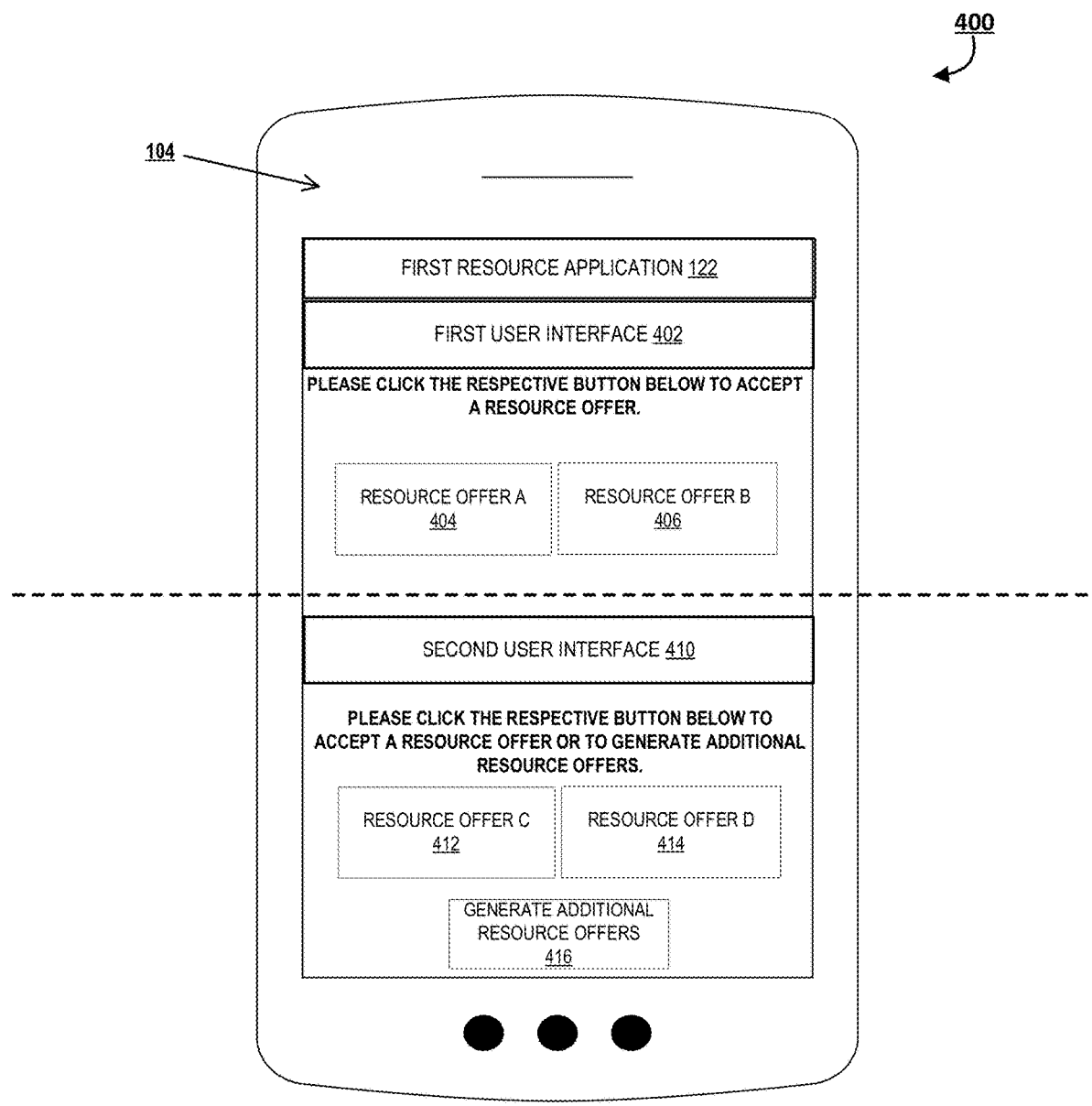

Having thus described embodiments of the invention in general terms, reference will now be made the accompanying drawings, wherein:

FIG. 1 illustrates an electronic activity processing system and environment;

FIG. 2 illustrates a flowchart of an exemplary method;

FIG. 3 illustrates an exemplary system for resource presentment and allocation;

FIG. 4 illustrates an exemplary user interface of a device; and

Figure 5:
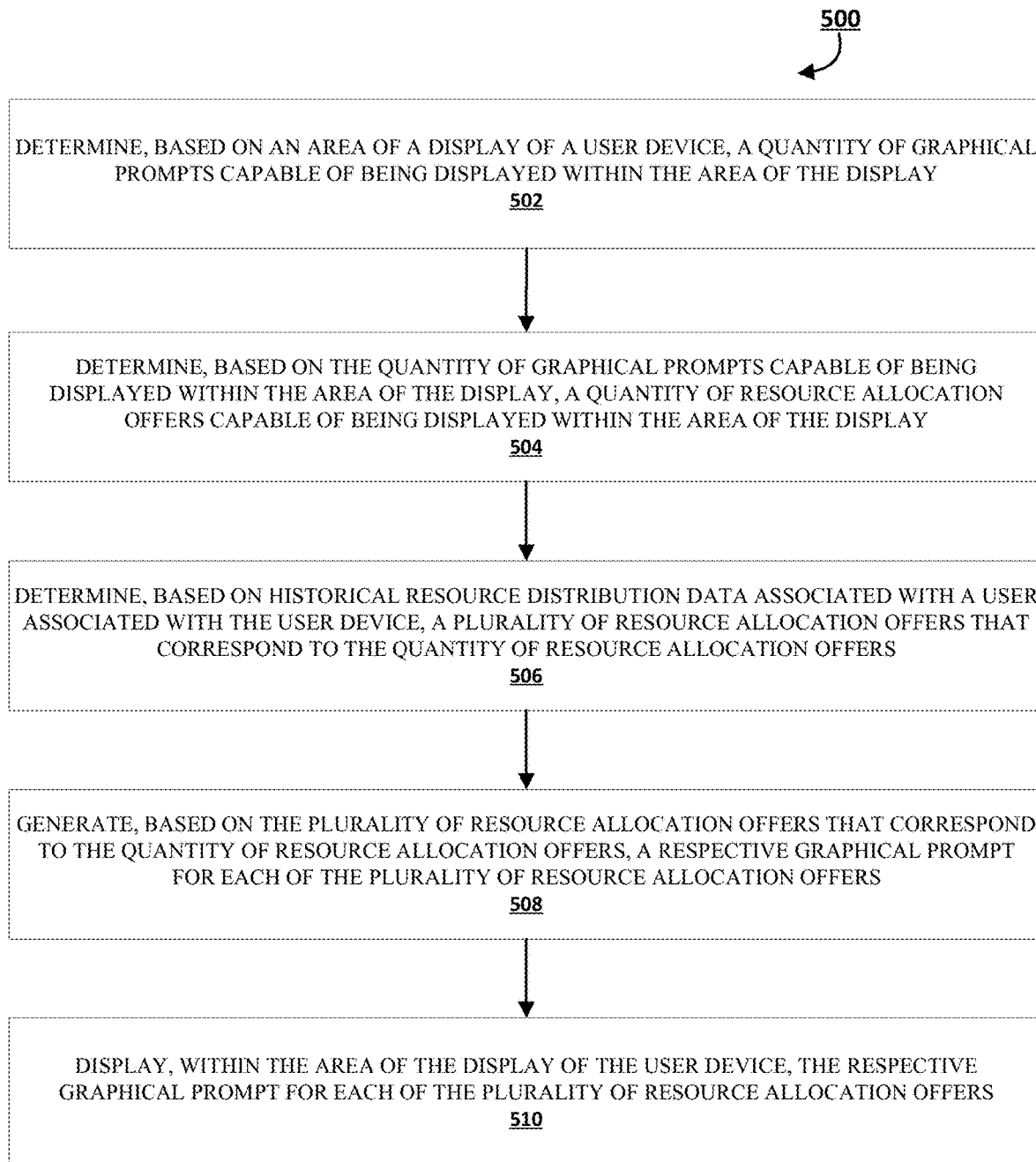

FIG. 5 a flowchart of an exemplary method.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

In some embodiments, an "entity" refers to an organization, a company, a group, an institute, a business or the like associated with initiating and/or performing electronic activities. Typically, the entity comprises systems, devices, applications and/or the like for initiating and/or performing electronic activities. In some embodiments, the entity initiates and/or performs electronic activities in response to receiving instructions from an associated user. In some embodiments, an "entity" as used herein may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user account that includes only personal information associated with the user, or the like. The account is associated with and/or maintained by an entity. In other embodiments, an "entity" may not be a financial institution. Examples for non-financial entities include cloud computing systems, database systems, block chain systems for data processing, and the like.

Unless specifically limited by the context, an "electronic activity", "user activity", "transaction" or "activity" refers to activities associated with electronic resources, such as the user's resources. In some embodiments, the electronic activity refers to resource transfers between resources, e.g., a transfer of a resource value from a first resource and a second resource. For example, the electronic activity may refer to transmission of resource value comprising predetermined data (e.g. files, text, images, and the like) from a first resource (e.g., a user device, a database, a server, a cloud storage system, and the like) to a second resource (e.g., another device, database, and the like). Typically, a first system (e.g., a user device or a networked device), for example, based on receiving instructions from a user, transmits activity parameters (e.g., location of the file, time of transmission, unique identifier of the source resource system, certificates of the target resource system, authentication information, and the like) to a recipient system (e.g., a system associated with one or more of the resources, an entity system, and the like) which then performs the electronic activity (transfer of the file from the source resource system to the target resource system). As another example, in some embodiments, the electronic activity refers to transfer of a resource value comprising financial resources (e.g. a predetermined transfer amount) from a first resource (e.g., a source user account) to a second resource (e.g., another target account). Typically, a first system (e.g., a user device), for example, based on receiving instructions from a user, transmits activity parameters (e.g., the transfer amount, time and date of the transfer, unique identifiers of the source user account and the target user account, and the like) to a recipient system (e.g., a financial institution associated with the source account and/or the target account) which then performs the electronic activity (transfer of the predetermined amount from the source user account to the target account).

As such, in some embodiments, an electronic activity or a user activity may refer to a purchase of goods or services, a return of goods or services, a payment transaction, a credit transaction, or other interaction involving a user's resources (e.g., a bank account). As another example, in some embodiments, a user activity may refer to viewing account balances, modifying user information and contact information associated with an account, modifying alert/notification preferences, viewing transaction/activity history, transferring/redeeming loyalty points and the like. In some embodiments, the user activity is associated with an entity application stored on a user device, for example, a digital wallet application, a mobile/online banking application, a merchant application, a browser application, a social media application and the like. Typically, a user activity is an electronic transaction or electronic activity in which the user is employing a mobile device, computing device, or other electronic device to initiate, execute and/or complete the activity.

As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a user activity or transaction may refer to one or more of a sale of goods and/or services, an account balance inquiry, a rewards transfer, an account money transfer, opening a bank application on a user's computer or mobile device, a user accessing their e-wallet (e.g., mobile wallet) or online banking account or any other interaction involving the user and/or the user's device that is detectable by the financial institution. As further examples, a user activity may occur when an entity associated with the user is alerted via the transaction of the user's location. A user activity may occur when a user accesses a building, uses a rewards card, and/or performs an account balance query. A user activity may occur as a user's device establishes a wireless connection, such as a Wi-Fi connection, with a point-of-sale terminal. In some embodiments, a user activity may include one or more of the following: purchasing, renting, selling, and/or leasing goods and/or services (e.g., groceries, stamps, tickets, DVDs, vending machine items, and the like); withdrawing cash; making payments (e.g., paying monthly bills; paying federal, state, and/or local taxes; and the like); sending remittances; transferring balances from one account to another account; loading money onto stored value cards (SVCs) and/or prepaid cards; donating to charities; and/or the like.

As used herein, an "online banking account" is an account that is associated with one or more user accounts at a financial institution. For example, the user may have an online banking account that is associated with the user's checking account, savings account, investment account, and/or credit account at a particular financial institution. Authentication credentials comprising a username and password are typically associated with the online banking account and can be used by the user to gain access to the online banking account. The online banking account may be accessed by the user over a network (e.g., the Internet) via a computer device, such as a personal computer, laptop, or mobile device (e.g., a smartphone or tablet). The online banking account may be accessed by the user via a mobile or online banking website or via a mobile or online banking application. A customer may access an online banking account to view account balances, view transaction history, view statements, transfer funds, and pay bills. More than one user may have access to the same online banking account. In this regard, each user may have a different username and password. Accordingly, one or more users may have a sub-account associated with the online banking account.

A "user" may be an individual or group of individuals associated with an entity that provides the system for assessing network authentication requirements based on situational instance. In some embodiments, the "user" may be a financial institution user (e.g., an account holder or a person who has an account (e.g., banking account, credit account, or the like)). In one aspect, a user may be any financial institution user seeking to perform user activities associated with the financial institution or any other affiliate entities associated with the financial institution. In some embodiments, the user may be an individual who may be interested in opening an account with the financial institution. In some other embodiments, a user may be any individual who may be interested in the authentication features offered by the financial institution/entity. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "customer" may be used interchangeably.

With advancements in technology infrastructures and wireless communication implementation, electronic devices such as transaction terminals such as point of sale terminals, portable multi-function devices, such as laptop computers, tablet computers, mobile phones, smart phones, wearable devices and the like are common. Typically, individuals may also have a mobile user device with them. These electronic devices may enable performance of user activities (e.g., financial activities, purchases, resource transfers, accessing resource data stored at other systems and databases and the like) based on requisite authorization. These electronic devices may also be configured to allow the user to perform the one or more user activities, transactions or resource transfers through an application, accept authentication credentials from the user, transmit authentication credentials for validation at external systems, etc.

Embodiments of the present invention address the above needs and/or achieve other advantages by providing apparatuses (e.g., a system, computer program product and/or other devices) and methods for dynamically appending and transforming static activity data transmitted to a user device application, as will be described in detail elsewhere in the specification. FIG. 1 illustrates an electronic activity processing system environment 100, in accordance with some embodiments of the present invention. FIG. 1 provides a unique system that includes specialized servers and systems, communicably linked across a distributive network of nodes required to perform the functions of processing resource transfer activities.

As illustrated in FIG. 1, a processing system 108, or electronic activity processing system 108 or application server (e.g., a financial institution system 108) is operatively coupled, via a network 101 to user devices such as a first networked device 104, a second networked device 164, and the like, to the recipient system 106 (e.g., another second financial institution system 106) and/or to one or more secondary systems. In this way, the processing system 108 can send information to and receive information from the user devices such as a first networked device 104, a second networked device 164, etc., the recipient system 106, and one or more secondary systems. FIG. 1 illustrates only one example of an embodiment of the system environment 100, and it will be appreciated that in other embodiments of the systems, devices, or servers may be combined into a single system, device, or server, or be made up of multiple systems, devices, or servers.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101. In some embodiments, the network 101 may enable communication between devices thorough near-field communication, transmission of electromagnetic waves, sound waves or any other suitable means.

In some embodiments, the first user 102 is an individual that has a user device, e.g., the first networked device 104, such as a mobile phone, tablet, computing device, or the like and who seeks to perform one or more electronic activities or user activities. In some embodiments, the second user 162 is another individual that has a user device, e.g., the second networked device 164, such as a mobile phone, tablet, computing device, or the like and who seeks to perform one or more electronic activities or user activities.

FIG. 1 also illustrates the first networked device 104. The first networked device 104 (also referred to as a first user device or a user device, which may be associated with the first user 102) may refer to a device or a combination of devices that are configured to capture (e.g., receive and/or process) one or more instructions, inputs, authentication credentials, and the like from the user 102 such as a computing device (e.g., a mobile device, a smart phone, a laptop computer and/or another computing device), smart devices (e.g., smart TVs, smart doors, smart speakers, personal digital assistant devices), wearable devices (e.g., smart watches, fitness devices, virtual/augmented reality devices), Global Positioning System (GPS) devices, proximity/location sensors/beacon devices, visual capture devices and/or the like to capture authentication credentials associated with the user. The first networked device 104 may be, for example, a desktop personal computer, a mobile system, such as a cellular phone, smartphone, personal data assistant (PDA), laptop, or the like.

The first networked device 104 comprises a communication device 112 comprising input/output devices and/or sensors, a processing device 114, and a memory device 116. The memory device 116 can be a non-transitory computer-readable storage medium. The first networked device 104 may comprise other devices that are not illustrated, configured for location determination/navigation (GPS devices, accelerometers, etc.), for authentication (fingerprint scanners, microphones, iris scanners, etc.), for image capture (cameras, AR devices, etc.), for display (screens, touchscreens, hologram projectors, etc.), and other purposes. The first networked device 104 is a computing system that enables the user to perform one or more user activities, e.g., initiating one or more electronic activities such as resource transfers, payment requests, etc. via one or more applications associated with the first networked device 104. For example, the first networked device 104 can be configured to present a resource allocation offer to the first user 102 of the first networked device 104.

The processing device 114 is operatively coupled to the communication device 112 and the memory device 116. The processing device 114 utilizes the communication device 112 to communicate with the network 101 and other devices on the network 101, such as, but not limited to, the processing system 108. For example, the communication device 112 can comprise a modem, a communications interface, a server, or other device for communicating with other devices on the network 101.

The first networked device 104 comprises the memory device 116, which can comprise computer-readable instructions 120 and data storage 118, which in one embodiment includes the computer-readable instructions 120 of a first resource application 122. The computer-readable instructions 120 can be computer-executable instructions that are executable by a processor and/or a processing device (e.g., the processing device 114). In some embodiments, the first networked device 104 may refer to multiple user devices that may be configured to communicate with each other, with the processing system, and/or other systems via the network 101. In some embodiments, the processing system 108 transmits data associated with the application 122 to and/or causes the processing device 114 to install/store the first resource application 122 on the first networked device 104. In some embodiments, the first resource application 122, when executed by the processing device 114, is configured to cause the first networked device 104 to perform one or more actions and/or steps described herein. In some embodiments, the first resource application 122 is similar to the electronic activity processing application 158 described below.

The first resource application 122 may be a standalone application configured for receiving data/instructions associated with an electronic activity from a user (e.g., via the first user interface 122*a* of the first resource application 122), transmitting electronic data and/or executing an action associated with the resource network as described herein, or the first resource application 122 may refer to one or more existing applications on the user device that are configured to perform one or more of these steps. In some embodiments, the first resource application 122 may be associated with a resource network application that facilitates the first user 102 interacting with a resource network. For example, the first resource application 122 may be a payment network application structured for person-to person (P2P) payments and/or real time payments (RTP), with the second user 162 being a part of the same payment network and having a corresponding payment network application structured for person-to person (P2P) payments and/or real time payments (RTP) (second resource application 174). As another example, the first resource application 122 can be configured to provide the first user 102 with one or more resource allocation offers. In some embodiments, the resource network may comprise the processing system 108 and/or a financial institution system may transmit electronic communications to the first networked device 104, which may be configured to cause the first resource application 122 to perform one or more functions, actions, or steps associated with electronic processing. For example, the electronic communications may cause the first resource application 122 to trigger one or more sensors or input devices of the first networked device 104 to capture and/or receive an authentication credential associated with the first user 102 based on instructions received via the electronic communications. For example, the first resource application 122 can be configured to capture an input from the first user 102 that indicates a resource offer allocation that the user 102 desires to utilize. The electronic communications may originate from the processing system 108, or another computing device in the system 100, to cause the first networked device 104 to request user input/information from the first user 102, and the like.

FIG. 1 also illustrates the second networked device 164. The second networked device 164 (also referred to as a second user device or a user device, which may be associated with the second user 162) may refer to a device or a combination of devices that are configured to capture (e.g., receive and/or process) one or more instructions, inputs, authentication credentials, and the like from the second user 162 such as a computing device (e.g., a mobile device, a smart phone, a laptop computer and/or another computing device), smart devices (e.g., smart TVs, smart doors, smart speakers, personal digital assistant devices), wearable devices (e.g., smart watches, fitness devices, virtual/augmented reality devices), GPS devices, proximity/location sensors/beacon devices, visual capture devices and/or the like to capture authentication credentials associated with the user. The second networked device 164 may be, for example, a desktop personal computer, a mobile system, such as a cellular phone, smartphone, personal data assistant (PDA), laptop, or the like.

The second networked device 164 comprises a communication device 162 comprising input/output devices and/or sensors, a processing device 168, and a memory device 170. The memory device 170 can be a non-transitory computer-readable storage medium. The second networked device 164 may comprise other devices that are not illustrated, configured for location determination/navigation (GPS devices, accelerometers, etc.), for authentication (fingerprint scanners, microphones, iris scanners, etc.), for image capture (cameras, AR devices, etc.), for display (screens, touch-screens, hologram projectors, etc.), and other purposes. The second networked device 164 is a computing system that enables the user to perform one or more user activities, e.g., initiating one or more electronic activities such as resource transfers, payment requests, etc. via one or more applications associated with the first networked device 104.

The processing device 168 is operatively coupled to the communication device 162 and the memory device 170. The processing device 168 utilizes the communication device 162 to communicate with the network 101 and other devices on the network 101, such as, but not limited to the processing system 108. For example, the communication device 162 can comprise a modem, a communications interface, a server, or other device for communicating with other devices on the network 101.

The second networked device 164 comprises the memory device 170, which can comprise computer-readable instructions 172 and data storage 178, which in one embodiment includes the computer-readable instructions 172 of a second resource application 174. The computer-readable instructions 172 can be computer-executable instructions that are executable by a processor and/or a processing device (e.g., the processing device 168). In some embodiments, the second networked device 164 may refer to multiple user devices that may be configured to communicate with each other, with the processing system, and/or other systems via the network 101. In some embodiments, the processing system 108 transmits data associated with the application 174 to and/or causes the processing device 168 to install/store the second resource application 174 on the second networked device 164. In some embodiments, the second resource application 174, when executed by the processing device 168, is configured to cause the second networked device 164 to perform one or more actions and/or steps described herein. In some embodiments, the second resource application 174 is similar to the electronic activity processing application 158 described below.

The second resource application 174 may be a standalone application configured for receiving data/instructions associated with an electronic activity from a user (e.g., via the second user interface 174*a* of the second resource application 174), transmitting electronic data and/or executing an action associated with the resource network as described herein, or the second resource application 174 may refer to one or more existing applications on the user device that are configured to perform one or more of these steps. In some embodiments, the second resource application 174 associated with the second user 162 may be associated with a resource network. For example, the second resource application 174 may be a payment network application structured for person-to person (P2P) payments and/or real time payments (RTP), with the first user 102 being a part of the same payment network and having a corresponding payment network application structured for person-to person (P2P) payments and/or real time payments (RTP) (first resource application 122). In some embodiments, the processing system 108 and/or a financial institution system may transmit electronic communications to the second networked device, which may be configured to cause the second resource application 174 to perform one or more functions or steps associated with electronic processing. For example, the electronic communications may cause the second resource application 174 to trigger one or more sensors or input devices of the second networked device 164 to capture and/or receive an authentication credential associated with the second user 162 based on instructions received via the electronic communications. As an example, the second resource application 174 can be configured to receive an input from the second user 162 that indicates that the second user 162 accepted a resource allocation offer. The electronic communications may originate from the processing system 108, or another computing device in the system 100, to cause the second networked device 164 to request user input/information from the second user 162, and the like.

As further illustrated in FIG. 1, the processing system 108 or the electronic activity processing system 108 generally comprises a communication device 146, a processing device 148, and a memory device 150. The memory device 150 can be a non-transitory computer-readable storage medium. As used herein, the term "processing device" generally includes circuitry used for implementing the communication and/or logic functions of the particular system. For example, a processing device may include a central processing unit (CPU), a digital signal processor device, a microprocessor device, and various analog-to-digital converters, digital-to-analog converters, and other support circuits and/or combinations of processing devices. Control and signal processing functions of the system are allocated between these processing devices according to their respective capabilities. The processing device 108 may be configured to operate one or more software programs and/or applications based on computer-readable instructions 154, which may be stored in a memory device 150. The computer-readable instructions 154 can be computer-executable instructions that are executable by a processor and/or a processing device (e.g., the processing device 148).

The processing device 148 is operatively coupled to the communication device 146 and the memory device 150. The communication device 146 can comprise a modem, a server, a communications interface, or other device for communicating with other devices on the network 101. The processing device 148 uses the communication device 146 to communicate with the network 101 and other devices on the network 101, such as, but not limited to the recipient system 106, the user device(s) 104, 164, and/or additional devise in communication with the network 101.

The processing system 108 comprises computer-readable instructions 154 stored in the memory device 150, which in one embodiment includes the computer-readable instructions 154 of an electronic activity processing application 158. In some embodiments, the memory device 150 includes data storage 152 for storing data associated with the processing system 108. For example, the data can be associated with the electronic activity processing application 158, the system 108, and/or the system 100. In some embodiments, executing the computer readable instructions of the electronic activity processing application 158 causes the processing device 148 to perform one or more steps and/or actions for electronic activity processing described herein.

The electronic activity processing application 158 may receive electronic activity data from the user devices, e.g., the first networked device 104 and/or the second networked device 164. In some embodiments, the processing system 108 may retrieve user authentication information, capture device information, financial information, identifiers, resource account information, and the like from the user devices (e.g., the first networked device 104, the second networked device 164, etc.) and/or the recipient system 106. In this way, the electronic activity processing application 158 may communicate with the recipient system 106, the user devices (e.g., the first networked device 104, the second networked device 164, etc.), a resource network, merchant systems, and other third-party systems.

In some embodiments, the electronic activity processing application 158 may control the functioning of the first networked device 104 and/or the second networked device 164. In some embodiments, the electronic activity processing application 158 may comprise computer readable instructions 154 or computer-readable program code, that when executed by the processing device 148, causes the processing device 148 to perform one or more steps described herein and/or transmit data to other systems and devices to cause the systems and devices to perform specific tasks. For example, the electronic activity processing application 158 may initiate a transfer of resources from a first resource to a second resource. As another example, the electronic activity processing application 158 can determine a resource allocation offer for a user (e.g., the first user 102, the second user 162, etc.). The electronic activity processing application 158 can determine the resource allocation offer for the user based on historical resource distribution data.

As illustrated in FIG. 1, the recipient system 106 is connected to the processing system 108 and may be associated with a financial institution network (e.g., a recipient bank for a resource transfer activity, an account transfer electronic activity, etc.). The recipient system 106 may refer to a financial institution system, a transaction terminal or other devices or systems associated with performing the activity. In this way, while only one recipient system 106 is illustrated in FIG. 1, it is understood that multiple network systems may make up the system environment 100. In some embodiments, the recipient system 106 is substantially similar to the processing system 108. The recipient system 106 generally comprises a communication device 136, a processing device 138, and a memory device 140. The memory device 140 can be a non-transitory computer-readable storage medium. The recipient system 106 comprises computer-readable instructions 142 stored in the memory device 140, which in one embodiment includes the computer-readable instructions 142 of a finalization authorization application 144. The computer-readable instructions 142 can be computer-executable instructions that are executable by a processor and/or a processing device (e.g., the processing device 138). In some embodiments, the processing system 108 (e.g., based on executing the application 158) transmits and/or causes the processing device 138 to install/store the finalization authorization application 144 on the recipient system 106. In some embodiments, the finalization authorization application 144, when executed by the processing device 138 is configured to cause the recipient system 106 to perform one or more steps described herein (e.g., transfer resources from a first resource to a second resource, determine a resource allocation offer, etc.). In some embodiments, the finalization authorization application 144 is similar to the electronic activity processing application 158 described above. The recipient system 106 may communicate with the processing system 108 to receive static activity data sets, indicate processing of static activity data sets, indicate completion of an electronic activity, request validation of authentication credentials, confirm a resource transfer, and the like. The processing system 108 may communicate with the recipient system 106 via a secure connection 160 generated for secure encrypted communications between the two systems. In some embodiments, the secure connection 160 may be an operative communication link/channel established via the network 101.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a flowchart of an exemplary method 200. The method 200 can be a computerized method. At block 202, a resource allocation offer associated with a resource distribution transaction is received by a resource network from an external resource entity. The resource network can be associated with a resource entity. For example, the resource allocation offer can be an offer for a refund of a certain amount of a resource used during the resource distribution transaction when a user processes the resource distribution at an entity. In an exemplary embodiment, the resource entity is not associated with the resource network.

At block 204, a user of a plurality of users that would utilize the resource allocation offer is determined based on historical resource distribution data stored within a memory resource. The historical resource distribution data can be updated based on the user's actions. For example, if the user completed a resource transaction associated with the resource allocation offer, the historical resource distribution data can be updated to indicate that the user completed the resource transaction.

At block 206, a first communication that indicates the resource allocation offer is transmitted to a user device associated with the user via a resource application. The resource application can be associated with a resource network. The user device can receive the communication and display an indication of the resource allocation offer to the user of the user device. For example, the resource application can be configured to display a graphical prompt on a display of the user device to indicate to the user of the user device the resource allocation offer.

At block 208, a second communication that indicates acceptance of the resource allocation offer is received from the user device associated with the user. For example, the user may provide an input to the user device to indicate that the user accepted the resource allocation offer. As an example, the user may interact with a touchscreen of the user device and actuates a graphical prompt that indicates that the user accepted the resource allocation offer. The user device can transmit the indication of the acceptance of the resource allocation offer.

At block 210, data that indicates that the user accepted the resource allocation offer is stored in the memory resource. For example, the historical resource distribution data can be updated to indicate that the user accepted the resource allocation. As another example, resource offer data may be updated to indicate that the user accepted the resource allocation.

At block 212, a third communication that indicates acceptance of the resource allocation offer is transmitted to the external resource entity. For example, the resource network may transmit a communication to the external resource entity to indicate that that the user accepted the resource allocation offer. The external resource entity can be configured to receive the communication from the resource network.

In another embodiment, an indication is received that the user completed a resource transaction associated with the resource allocation. The data that indicates that the user completed the resource transaction associated with the resource allocation offer can be stored within a memory resource. A communication that indicates that the user completed the resource transaction associated with the resource allocation offer is transmitted to the external resource entity.

In another embodiment, another resource allocation offer can be determined based on updated historical resource distribution offer. The another resource allocation offer comprises one or more features that are similar to the resource allocation offer. A communication that indicates that the another resource allocation offer can be transmitted to the user device via the resource application. For example, because the user accepted the previous resource allocation offer and completed a transaction associated with the resource allocation offer, the resource network can determine that the user would prefer similar offers in the future.

In another embodiment, a resource account associated with the user is determined. A quantity of resource to credit to the resource account associated with the user can be determined based on the resource allocation offer and based on the indication that the user completed the resource transaction. The quantity of resource can be added to the resource account associated with the user. For example, the resource allocation offer can be a refund for a pre-determined amount of the resource used to complete the resource transaction. The refund can be added to the user's resource account once the resource transaction is completed.

In another embodiment, another resource allocation offer is received by the resource network from another external resource entity. The resource allocation offer and the another resource allocation offer can be determined to be associated with the same resource distribution transaction. The another resource allocation offer can be determined to not be utilized by the user based on the resource allocation offer. For example, the another resource allocation offer can be the same resource allocation offer, and the user would not utilize both offers as they are identical. Accordingly, the another resource allocation offer can not be presented to the user.

In another embodiment, the user would prefer the resource allocation offer can be determined based on preference data associated with the plurality of users. The preference data associated with the user can be modified based on the acceptance of the resource allocation offer to indicate that the user accepted the resource allocation offer. The modified preference data associated with the user may be stored within the memory resource. For example, the preference data can be modified to indicate what the user prefers the resource allocation offer so that similar resource allocation offers can be provided to the user in the future.

FIG. 3 illustrates an exemplary system 300 for resource presentment and allocation. Specifically, the system 300 illustrates the first networked device 104 of FIG. 1 communicating with the processing system 108 via a communications channel 302. For example, the first networked device 104 can utilize the first resource application 122 to communicate with the processing system 108. The processing system 108 and the communications channel 302 can be associated with a resource network 301. The first resource application 122 may be configured to execute one or more actions associated with the resource network 301 based on inputs received from a user of the first networked device 104.

The communications channel 302 may be a wired network and/or a wireless network that facilitates communication among a plurality of devices associated with the resource network 301. For example, the communications channel 302 can be configured to operate as a router to route communications among a plurality of devices of the resource network 301. The first networked device 104 may transmit a communication to the resource network 301 via the communications channel 302. For example, the first networked device 104 may send a communication to the processing system 108 via the communications channel 302. Thus, the communications channel 302 can facilitate communications between the first networked device 104 and the processing system 108.

The system 300 also comprises an external resource entity 304, which is external relative to the resource network 310. The external resource entity 304 can be a third-party entity that is not associated with the resource network 301 or the first networked device 104. The external resource entity 304 can provide one or more resource allocation offers to the processing system 108. For example, the external resource entity 304 can provide the one or more resource allocation offers to the processing system 108 as rewards and/or gifts for one or more users associated with the resource network 301. The resource allocation offers can be associated with a resource transaction associated with a specific entity. The resource allocation offers can provide a refund based on a percentage of a resource utilized for the resource transaction. As an example, a resource allocation offer can provide that a user who completes a resource transaction at a specific sporting goods store receives a percentage back of the amount spent when completing the resource transaction. As another example, a resource allocation offer could provide a pre-determined physical item or another reward and/or gifts to the user if the user completes a specific resource transaction.

The processing system 108 comprises historical usage data 306 that is stored in a memory resource. The historical usage data 306 can comprise data that indicates how one or more users utilize a resource. For example, the historical usage data 306 can comprise information on how users utilize a resource account associated with the resource network 301. The historical usage data 306 can be utilized by the processing system 108 to determine one or more resource allocation offers that a user may be interested in. For example, if historically a user utilizes the resource account only at a specific entity (e.g., a store), the processing system 108 can determine that the user is unlikely to use the resource account anywhere else based on their previous actions. Thus, the processing system 108 can determine that the user of the user account would likely only be interested in resource allocation offers associated with the specific entity. Accordingly, the processing system 108 can utilize the historical usage data 306 to better tailor (e.g., more accurately determine) one or more resource allocation offers to the users.

In one embodiment, the historical usage data 306 comprises data associated with a plurality of users. The historical usage data 306 can comprise one or more attributes associated with the plurality of users. The one or more attributes can indicate a stage in life, location, etc. The processing system 108 can utilize the one or more attributes to determine one or more user that comprise similar attributes. The processing system 108 can provide one or more resource allocation offers to the users with the similar attributes based on what similar users utilized previously. As an example, if a first user has similar attributes to a second user and the first user accepted and utilized a resource allocation offer, the processing system 108 can determine that the second user may also accept and utilize the resource allocation offer based on the similar attributes.

The one or more attributes can also indicate whether a user has one or more products associated with the resource network 301. As an example, the user may have a credit card, an auto loan, and a mortgage that the user received from the resource network 301. The processing system 108 can utilize these attributes to determine one or more resource allocation offers that the user may desire. Returning the aforementioned example, the processing system 108 can determine based on the auto loan that the user may be interested in resource allocation offers associated with automobile products, such as automobile services, car insurance, etc. As another example, the processing system 108 may determine that the user may be interested in a resource allocation offer associated with a home improve store based on the user taking out the mortgage. Accordingly, the processing system 108 can utilize the one or more attributes of the users to determine resource allocation offers for the users.

The processing system 108 also comprises resource offer data 308 that is stored in a memory resource. The resource offer data 308 can comprise data on resource allocation offers that have been provided by the external resource entity 304. For example, the processing system 108 can store data related to all past and/or active resource allocation offers that the external resource entity 304 has provided to the processing system 108. Additionally, the resource offer data 308 can comprise data related to resource allocation offers that one or more users have utilized or have not utilized. For example, the resource offer data 308 can indicate the resource allocation offers that a user has utilized, which can indicate that the user would be interested in similar resource allocation offers in the future. As another example, the resource offer data 308 can indicate the resource allocation offers that a user has not utilized, which can indicate that the user would not be interested in similar resource allocation offers in the future.

The processing system 108 can comprise artificial intelligence 310. The artificial intelligence 310 can include machine learning or any other form of device learning. The artificial intelligence 310 can be configured to personalize resource allocation offers to a given user. For example, the artificial intelligence 310 can utilize the historical usage data 306 and the resource offer data 308 to determine what resource allocation offers a user may desire to utilize. The processing system 108 can also utilize the artificial intelligence 310 to improve the offers that are provided to users associated with the resource network 310. For example, the artificial intelligence 310 can utilize a classifier to determine whether a user would be interested in a specific resource allocation offer. The classifier can be configured to receive data related to a user and a specific resource allocation offer and output a probability that indicates the accuracy of the classification of the data. For example, the classifier can output that the specific resource allocation has a 0.85 probability to be successful for the user. The classifier can provide the output to the processing system 108 to more accurately determine which resource allocation offers a given user desires. The classifier may be a trained classifier that was trained from a training data set. The training data set may comprise previously known data that indicates a known input with a known result. Additionally, the classifier can be continually trained based on all of the data the classifier receives to further refine and improve the operation of the classifier.

The artificial intelligence 310 may be configured to implement any of the following applicable machine learning algorithms either singly or in combination: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style.

Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method, a kernel method, a clustering method, an associated rule learning algorithm, an artificial neural network model, a deep learning algorithm, a dimensionality reduction method (e.g., principal component analysis, partial least squares regression, Sammon mapping, multidimensional scaling, projection pursuit, etc.), an ensemble method (e.g., boosting, bootstrapped aggregation, stacked generalization, gradient boosting machine method, random forest method, etc.), and any suitable form of machine learning algorithm.

The artificial intelligence 310 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the artificial intelligence 310. Further, any suitable model (e.g., machine learning, non-machine learning, etc.) can be used in generating data relevant to the artificial intelligence 310.

The processing system 108 also comprises user interface generator 312. The user interface generator 312 can generate a user interface based on one or more constraints. The user interface generator 312 can generate a user interface that indicates one or more resource allocation offers. For example, the user interface generator 312 can generate an optimized graphical user interface based on one or more attributes of a device. As an example, the first networked device 104 may have a display with limited space. Thus, the user interface generator 312 cannot generate an infinite number of graphical prompts on the display. Further, the graphical prompts may have a minimum size which is legible to a user. Accordingly, the user interface generator 312 can consider these constraints when generating one or more graphical prompts. As an example, the user interface generator 312 can determine that a user device's display can only handle two graphical prompts before the graphical prompts would become illegible. Thus, the user interface generator 312 can generate two graphical prompts for the user device. Accordingly, the user interface generator 312 can generate graphical user interfaces based on one or more constraints and/or attributes of a device.

The processing system 108 can utilize the artificial intelligence 310 and the user interface generator 312 to optimize resource allocation offers for the first networked device 104. For example, the artificial intelligence may identify five resource allocation offers that a user of the first networked device 104 would be interested in. The artificial intelligence may identify the five resource allocation offers based on the historical usage data 306 and/or the resource offer data 308. However, the user interface generator 312 may determine that the first networked device 104 can only display three graphical prompts in a legible manner. Thus, the processing system 108 cannot provide the first networked device 104 with all five resource allocation offers that the user may be interested in utilizing because the display of the first networked device 104 would be unable to legible display all of the graphical prompts. Accordingly, the processing system 108 can utilize the artificial intelligence 310 to determine the three resource allocation offers out of the five identified resource allocation offers that the user is most likely to utilize. The processing system 108 can then provide the determined three resource allocation offers to the first networked device 104. In this manner, the processing system 108 is able to optimize the resource allocation offers provided to the first networked device 104 based on any display limitations associated with the first networked device 104, while providing the user of the first networked device 104 with the resource allocation offers that the user is most likely to utilize.

FIG. 4 illustrates an exemplary user interface 400 of a device. The first networked device 104 may display on a screen the first resource application 122. The first resource application 122 can facilitate a resource transfer for a user of the first networked device 104. The first resource application 122 can have a first user interface 402 that is associated with one or more resource allocation offers associated with a user of the user device. For example, the first resource application 122 can display one or more graphical prompts 404, 406 associated with the one or more resource allocation offers for a user to select one or more of the resource allocation offers. As shown, the first user interface 402 prompts the user to please click the respective button below to accept a resource offer. The first user interface 402 can display one or more resource offers below the prompt. Specifically, the first user interface 402 displays a graphical prompt 404 that indicates resource offer A and a graphical prompt 406 that indicates resource offer B. The resource offers can be resource allocation offers that the user can utilize.

The quantity of graphical prompts 404, 406 shown on the display can be determined based on a size of the display. For example, the graphical prompts 404, 406 associated with the resource offers may have a minimum size that would be legible to a user. As an example, the graphical prompts 404, 406 may need to be a minimum of 200 pixels wide in order to be legible to a user viewing the first user interface 402. If the display has a width of 500 pixels, the display can support a maximum of two graphical prompts based on the minimum required width of the graphical prompts. Accordingly, the first user interface 402 displays only the two graphical prompts 404, 406 as adding additional graphical prompts would render the graphical prompts illegible. Thus, the first resource application 122 can optimize the first user interface 402 to comprise the proper number of graphical prompts based on the display.

The user may input a response via an input device such as a touchscreen, keyboard, pointing device, etc. or verbally to a microphone of the first networked device 104. The first resource application 122 can receive the interaction from the user and determine that the user selected either the resource offer A or the resource offer B. For example, the first resource application 122 may know which portion of the display that the graphical prompts 404, 406 occupy on the display such that when a user interaction is received within a portion of the display associated with one of the graphical prompts 404, 406 the first resource application 122 is able to determine which of the resource offers was selected.

The first resource application 122 can have a second user interface 410. The first resource application 122 can have a second user interface 402 that is associated with one or more resource allocation offers associated with a user of the user device. For example, the first resource application 122 can display one or more graphical prompts 412, 414 associated with the one or more resource allocation offers for a user to select one or more of the resource allocation offers. Additionally, the second user interface 410 comprise a graphical prompt 416 that indicates generate additional resource offers. As shown, the second user interface 410 prompts the user to please click the respective button below to accept a resource offer or to generate additional resource offers. The resource offers can be resource allocation offers that the user can utilize. The second user interface 410 can display one or more resource offers below the prompt. Specifically, the second user interface 410 displays a graphical prompt 412 that indicates resource offer C, a graphical prompt 414 that indicates resource offer D, and a graphical prompt 416 that indicates generate additional resource offers.

The graphical prompt 416 can be utilized as a feedback mechanism to ensure that the user is provided with resource offers that the user desires. For example, if the user is not interested in either the resource offer C or the resource offer D, the user can select the graphical prompt 416 to generate additional resource offers. The first resource application 122, in response to receiving an indication that the user desires additional resource offers, can transmit a communication to another device (e.g., the resource network 301) to request additional resource offers. The communication can indicate that the user did not desire either of the presented resource offers C or D. The resource network can utilize the feedback provided by the user to improve resource offers in the future. For example, the resource offers C and D may not be offered to the user again. As another example, the offers C and D may be presented to the user after a certain time has passed to see if the user is now interested in the offers. Accordingly, the second user interface 410 can be utilized by the first resource application 122 and/or the resource network to received feedback from the user and improve the resource offers that are presented to the user in the future.

FIG. 5 a flowchart of an exemplary method 500. The method 500 can be a computerized method. At block 502, a quantity of graphical prompts capable of being displayed within an area of a display of a user device is determined based on the area of the display. For example, the area can be defined by a number of pixels associated with the display, and the graphical prompts may have a minimum size in terms of pixels to ensure that the graphical prompts are visible and/or legible to a user viewing the display of the user device.

At block 504, a quantity of resource allocation offers capable of being displayed within the area of the display is determined based on the quantity of graphical prompts capable of being displayed within the area of the display. Each of the plurality of resource allocation offers can be associated with a respective resource distribution transaction. For example, the display of the user device may be able to only handle a certain number of resource allocation offers due to screen size. Thus, the number of resource allocation offers to provide to the user can be determined based on the size of the display.

At block 506, a plurality of resource allocation offers that correspond to the quantity of resource allocation offers can be determined based on historical resource distribution data associated with a user of the user device. For example, the historical resource distribution data can indicate previous resource allocation offers that the user accepted and utilized. As another example, the historical resource distribution data can indicate resource transactions that the user has previously completed, which can be utilized to determine what resource allocation offers the user will use in the future. As an example, if the user regularly shops at a specific entity, the user will likely utilize a resource allocation offer associated with the entity.

At block 508, a respective graphical prompt for each of the plurality of resource allocation offers is generated based on the plurality of resource allocation offers that correspond to the quantity of resource allocation offers. For example, if the display of the user device is able to display two resource allocation offers, two graphical prompts can be generated for each of the resource allocation offers.

At block 510, the respective graphical prompt for each of the plurality of resource allocation offers is displayed within the area of the display of the user device. For example, the respective graphical prompt for each of the plurality of resource allocation offers can be transmitted to the user device via resource application associated with a resource network. The respective graphical prompt for each of the plurality of resource allocation offers can be displayed via the resource application.

In another embodiment, an indication that the user actuated at least one of the graphical prompts to indicate that the user accepted the resource allocation offer is received. Data that indicates that the user accepted the resource allocation offer can be stored in a memory resource. A communication that indicates that the user accepted the resource allocation offer can be transmitted to an external resource entity. For example, the user can interact with a touchscreen associated with the user device that is displaying the graphical prompts to indicate a resource allocation offer that the user desires to utilize. The resource network can receive the indication from the user device and transmit a communication to the external resource entity to indicate the user selected the resource allocation offer.

In another embodiment, an indication that the user completed a resource transaction associated with the resource allocation offer can be received. Data that indicates that the user completed the resource transaction associated with the resource allocation offer can be stored within a memory resource. Another communication that indicates that the user completed the resource transaction associated with the resource allocation offer can be transmitted to the external resource entity.

In another embodiment, a resource account associated with the user is determined. A quantity of resources to credit to the resource account associated with the user can be determined based on the resource allocation off and based on the indication that the user completed the resource transaction. The quantity of resources can be added to the resource account associated with the user. For example, the resource allocation offer can be a refund for a pre-determined amount of the resource used to complete the resource transaction. The refund can be added to the user's resource account once the resource transaction is completed.

In another embodiment, a graphical notification that indicates that the quantity of resources was added to the resource account associated with the user can be generated. The graphical notification that indicates that the quantity of resource was added to the resource account associated with the user can be displayed. For example, after the user has completed a resource transaction associated with the resource allocation offer, a refund associated with the resource allocation offer can be added to the resource account associated with the user. In response to the refund being credited to the resource account, the resource network can transmit a communication to the user device to indicate the refund being credited to the resource account. The user device can display the communication to the user.

In another embodiment, it can be determined that the user would prefer the resource allocation offer based on preference data associated with the use. The preference data associated with the user may be modified to indicate that the user accepted the resource allocation offer based on the acceptance of the resource allocation offer. The modified preference data associated with the user can be stored within the memory resource. For example, the preference data can be modified to indicate what the user prefers the resource allocation offer so that similar resource allocation offers can be provided to the user in the future.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resource correlation based on resource usage, the system comprising:
   at least one memory device;
   at least one communication device connected to a communications network;
   at least one processing device operatively coupled to the at least one memory device; and
   a module stored in the at least one memory device comprising executable instructions that when executed by the at least one processing device, cause the at least one processing device to:
      determine, based on an area of a display of a user device, a quantity of graphical prompts capable of being displayed within the area of the display,
      determine, based on the quantity of graphical prompts capable of being displayed within the area of the display, a quantity of resource allocation offers capable of being displayed within the area of the display, wherein each of the quantity of resource allocation offers are associated with a respective resource distribution transaction,
      determine, based on historical resource distribution data associated with a user associated with the user device, a plurality of resource allocation offers that correspond to the quantity of resource allocation offers,
      generate, based on the plurality of resource allocation offers that correspond to the quantity of resource allocation offers, a respective graphical prompt for each of the plurality of resource allocation offers, and
      display, within the area of the display of the user device, the respective graphical prompt for each of the plurality of resource allocation offers.

2. The system of claim 1, wherein the executable instructions further cause the at least one processing device to:
   receive an indication that the user actuated at least one of the graphical prompts to indicate the user accepted a resource allocation offer;
   store, in a memory resource, data that indicates that the user accepted the resource allocation offer; and
   transmit, to an external resource entity, a communication that indicates that the user accepted the resource allocation offer.

3. The system of claim 1, wherein the executable instructions further cause the at least one processing device to:
   receive an indication that the user completed a resource transaction associated with a resource allocation offer;
   store, in a memory resource, data that indicates that the user completed a resource transaction associated with the resource allocation offer; and
   transmit, to an external resource entity, another communication that indicates that the user completed the resource transaction associated with the resource allocation offer.

4. The system of claim 3, wherein the executable instructions further cause the at least one processing device to:
   determine a resource account associated with the user;
   determine, based on the resource allocation offer and based on the indication that the user completed the resource transaction, a quantity of resources to credit to the resource account associated with the user; and
   add the quantity of resources to the resource account associated with the user.

5. The system of claim 4, wherein the executable instructions further cause the at least one processing device to:
   generate a graphical notification that indicates that the quantity of resources was added to the resource account associated with the user; and
   display the graphical notification that indicates that the quantity of resources was added to the resource account associated with the user.

6. The system of claim 1, wherein the executable instructions further cause the at least one processing device to:
   determine, based on preference data associated with the user, that the user would prefer a resource allocation offer;
   modify, based on acceptance of the resource allocation offer, preference data associated with the user to indicate that the user accepted the resource allocation offer; and
   store, within a memory resource, the modified preference data associated with the user.

7. The system of claim 1, wherein the executable instructions that cause the at least one processing device to display the respective graphical prompt for each of the plurality of resource allocation offers further cause the at least one processing device to:
   transmit, to the user device via a resource application associated with a resource network, the respective graphical prompt for each of the plurality of resource allocation offers; and
   display, via the resource application, the respective graphical prompt for each of the plurality of resource allocation offers.

8. A computer program product for resource correlation based on resource usage, the computer program product comprising at least one non-transitory computer-readable medium having computer-readable program code portions embodied therein, the computer-readable program code portions comprising:
   an executable portion configured for determining, based on an area of a display of a user device, a quantity of graphical prompts capable of being displayed within the area of the display,
   an executable portion configured for determining, based on the quantity of graphical prompts capable of being displayed within the area of the display, a quantity of resource allocation offers capable of being displayed within the area of the display, wherein each of the quantity of resource allocation offers are associated with a respective resource distribution transaction,
   an executable portion configured for determining, based on historical resource distribution data associated with a user associated with the user device, a plurality of resource allocation offers that correspond to the quantity of resource allocation offers,
   an executable portion configured for generating, based on the plurality of resource allocation offers that correspond to the quantity of resource allocation offers, a respective graphical prompt for each of the plurality of resource allocation offers, and an executable portion configured for displaying, within the area of the display of the user device, the respective graphical prompt for each of the plurality of resource allocation offers.

9. The computer program product of claim 8, further comprising:
an executable portion configured for receiving an indication that the user actuated at least one of the graphical prompts to indicate the user accepted a resource allocation offer;
an executable portion configured for storing, in a memory resource, data that indicates that the user accepted the resource allocation offer; and
an executable portion configured for transmitting, to an external resource entity, a communication that indicates that the user accepted the resource allocation offer.

10. The computer program product of claim 9, further comprising:
an executable portion configured for receiving an indication that the user completed a resource transaction associated with a resource allocation offer;
an executable portion configured for storing, in the memory resource, data that indicates that the user completed the resource transaction associated with the resource allocation offer; and
an executable portion configured for transmitting, to the external resource entity, another communication that indicates that the user completed the resource transaction associated with the resource allocation offer.

11. The computer program product of claim 10, further comprising:
an executable portion configured for determine a resource account associated with the user;
an executable portion configured for determine, based on the resource allocation offer and based on the indication that the user completed the resource transaction, a quantity of resources to credit to the resource account associated with the user; and
add the quantity of resources to the resource account associated with the user.

12. The computer program product of claim 11, further comprising:
an executable portion configured for generating a graphical notification that indicates that the quantity of resources was added to the resource account associated with the user; and
an executable portion configured for displaying the graphical notification that indicates that the quantity of resources was added to the resource account associated with the user.

13. The computer program product of claim 8, further comprising:
an executable portion configured for determining, based on preference data associated with the user, that the user would prefer the resource allocation offer;
an executable portion configured for modifying, based on the acceptance of the resource allocation offer, preference data associated with the user to indicate that the user accepted the resource allocation offer; and
an executable portion configured for storing, within a memory resource, the modified preference data associated with the user.

14. The computer program product of claim 8, wherein the executable portion configured to display the respective graphical prompt for each of the plurality of resource allocation offers further comprises:

an executable portion configured for transmitting, to the user device via a resource application associated with a resource network, the respective graphical prompt for each of the plurality of resource allocation offers; and
an executable portion configured for displaying, via the resource application, the respective graphical prompt for each of the plurality of resource allocation offers.

15. A computer-implemented method for resource correlation based on resource usage, the method comprising:
providing a computing system comprising a computer processing device and a non-transitory computer readable medium, where the computer readable medium comprises configured computer program instruction code, such that when said instruction code is operated by said computer processing device, said computer processing device performs the following operations:
determining, based on an area of a display of a user device, a quantity of graphical prompts capable of being displayed within the area of the display,
determining, based on the quantity of graphical prompts capable of being displayed within the area of the display, a quantity of resource allocation offers capable of being displayed within the area of the display, wherein each of the plurality of resource allocation offers are associated with a respective resource distribution transaction,
determining, based on historical resource distribution data associated with a user associated with the user device, a plurality of resource allocation offers that correspond to the quantity of resource allocation offers,
generating, based on the plurality of resource allocation offers that correspond to the quantity of resource allocation offers, a respective graphical prompt for each of the plurality of resource allocation offers, and
displaying, within the area of the display of the user device, the respective graphical prompt for each of the plurality of resource allocation offers.

16. The computer-implemented method of claim 15, further comprising:
receiving an indication that the user actuated at least one of the graphical prompts to indicate the user accepted a resource allocation offer;
storing, in a memory resource, data that indicates that the user accepted the resource allocation offer; and
transmitting, to an external resource entity, a communication that indicates that the user accepted the resource allocation offer.

17. The computer-implemented method of claim 16, further comprising:
receiving an indication that the user completed a resource transaction associated with the resource allocation offer;
storing, in the memory resource, data that indicates that the user completed a resource transaction associated with the resource allocation offer; and
transmitting, to the external resource entity, another communication that indicates that the user completed the resource transaction associated with the resource allocation offer.

18. The computer-implemented method of claim 17, further comprising:
determining a resource account associated with the user;
determining, based on the resource allocation offer and based on the indication that the user completed the resource transaction, a quantity of resources to credit to the resource account associated with the user; and adding the quantity of resources to the resource account associated with the user.

19. The computer-implemented method of claim 18, further comprising:
    generating a graphical notification that indicates that the quantity of resources was added to the resource account associated with the user; and
    displaying the graphical notification that indicates that the quantity of resources was added to the resource account associated with the user.

20. The computer-implemented method of claim 15, further comprising:
    determining, based on preference data associated with the user, that the user would prefer a resource allocation offer;
    modifying, based on the acceptance of the resource allocation offer, preference data associated with the user to indicate that the user accepted the resource allocation offer; and
    storing, within a memory resource, the modified preference data associated with the user.

\* \* \* \* \*